Nov. 7, 1950  S. A. HARVEY ET AL  2,528,514
METHOD FOR THE MANUFACTURE OF SUPERPHOSPHATE
Filed Dec. 20, 1947  3 Sheets-Sheet 1

Stewart A. Harvey
and
Grover L. Bridger  INVENTOR.

BY Bentley O'Morrow
ATTORNEY.

Nov. 7, 1950  S. A. HARVEY ET AL  2,528,514
METHOD FOR THE MANUFACTURE OF SUPERPHOSPHATE
Filed Dec. 20, 1947  3 Sheets-Sheet 3

Stewart A. Harvey
and
Grover L. Bridger  INVENTOR.

BY Bentley Morrow

ATTORNEY.

Patented Nov. 7, 1950

2,528,514

UNITED STATES PATENT OFFICE 2,528,514

METHOD FOR THE MANUFACTURE OF SUPERPHOSPHATE

Stewart A. Harvey, near Sheffield, Ala., and Grover L. Bridger, Ames, Iowa, assignors to Tennessee Valley Authority, a corporation of the United States Application December 20, 1947, Serial No. 792,888

5 Claims. (Cl. 71—41)

(Granted under the act of March 3, 1883, as amended April 30, 1928; 370 O. G. 757)

The invention herein described may be manufactured and used by or for the Government of the United States for governmental purposes without the payment to us of any royalty thereon.

This invention relates to improvements in methods and apparatus for the manufacture of superphosphate. In one particular aspect it relates to improvements in methods for intimately mixing finely divided phosphate rock and phosphoric acid, and in another aspect it relates to improvements in apparatus for continuously mixing these materials.

When phosphate rock is acidulated with sulfuric acid in the manufacture of normal superphosphate, the resulting mixture remains fluid for several minutes before it sets to form a solid mass. Because of the prolonged fluid state, thorough mixing of these materials is easily obtained.

However, when phosphate rock is acidulated with phosphoric acid in the manufacture of superphosphate the resulting mixture undergoes three distinct stages of physical characteristics. In the first stage the mixture is quite fluid and is easily mixed; in the second stage it is plastic and is mixed with difficulty; and in the third stage the mixture becomes relatively dry and crumbly and is easily broken up. The duration of these stages depends on the source, grade ($P_2O_5$ content), and particle size of the phosphate rock; the concentration of the phosphoric acid; the proportion of acid to rock; the temperature of the reactants and the intensity of mixing.

The duration of the fluid stage, when using phosphoric acid, is much less than when sulfuric acid is employed. It is usually less than one minute and may often be as low as ten seconds. Therefore, in the manufacture of concentrated superphosphate, rapid, intensive mixing of the reactants is necessary.

For this reason superphosphate has been manufactured principally by batch methods. In typical commercial processes finely ground phosphate rock and strong phosphoric acid are introduced into a batch-type mixer at a temperature in the range from about 150° to 200° F. These materials are then mechanically agitated until the resulting superphosphate is sufficiently dry and crumbly to be discharged from the mixer. The time per cycle is about 2½ minutes, of which one minute is for actual mixing.

It is not considered economical in batch processes to use lower reactant temperatures, lower acid concentration, or higher total acidulation, which have been found to give a higher degree of conversion of the $P_2O_5$ contained in the rock to soluble form, because longer mixing time would be required to produce a dry product. Power, labor, and maintenance costs are high in batch type mixing operations. The thoroughness of mixing obtained is also less than is desirable.

U. S. Patent 2,115,742, issued May 3, 1938, discloses a mechanical mixer, containing moving blades, which is adapted to produce superphosphate. This mixer operates satisfactorily, but has the disadvantage of requiring suspension of operations at intervals of about eight hours to permit removal of solid superphosphate with which it becomes clogged. If the phosphate-acid material is allowed to cake excessively or if hard lumps are encountered mixers of this type are subject to excessive mechanical strain and breakage. Repair and maintenance costs are accordingly high.

U. S. Patent 2,148,209, issued February 21, 1939, shows a mixer adapted to produce normal and superphosphates continuously. This mixer is of the moving blade type and, like all moving blade mixers, is subject to operational difficulties when very quick-setting mixtures are produced.

A cheap, dependable method for continuously mixing finely divided phosphate rock with phosphoric acid which may be operated for long periods of time without a shut-down and which requires a minimum of attention is very desirable.

It is an object of this invention to provide a method for preparing superphosphate by intimately mixing finely divided phosphate rock and phosphoric acid and which may be performed continuously for long periods of time.

Another object is to provide such a method which requires a minimum of attention.

Another object is to provide such a method which is operable over wide temperature acid concentration, and acid-rock proportion ranges.

Another object is to provide such a method which may be carried out in apparatus which has no moving parts.

Another object is to provide a method for intimately and continuously mixing phosphate rock and phosphoric acid in a funnel-shaped mixing zone and for removing the resulting mixture therefrom while the mixture is still fluid.

Another object is to provide a method and apparatus for intimately and continuously mixing finely divided phosphate rock and phosphoric acid wherein difficult and expensive mixing in plastic and solid stages is avoided.

Still another object is to provide an apparatus for continuous and convenient mixing of finely divided phosphate rock and phosphoric acid.

Another object is to provide such an apparatus which is simple, rugged, cheap in construction, fool-proof, and which has the particular advantageous arrangement of parts shown and described.

Other objects and advantages will become apparent as this disclosure proceeds.

General statement of the invention

We have now found that these objects may be attained by providing a mixing vessel of conical or funnel shape, introducing finely divided phosphate rock and phosphoric acid in separate streams into this vessel and intimately mixing the materials introduced by the swirling and turbulence of the acid and rock at a location adjacent to an outlet at the bottom of the conical or funnel-shaped vessel.

The mixing vessel of our invention comprises an upper portion, having the general shape of the frustum of an inverted cone, which is open at the bottom. Preferably, a hollow, cylindrical lower portion having a passage through it of a size to correspond with the open bottom of the upper portion is attached to the conical upper portion and is so disposed that the passage forms a continuation of the open bottom of the upper portion. A plurality of inlets are disposed in the upper part of the upper conical portion of the vessel and are adapted to inject phosphoric acid at controlled rate and velocity tangentially and downward upon the inner surface of the conical portion. Means for continuously introducing a stream of finely divided phosphate rock into the conical upper portion at controlled rate and velocity and means for directing the rock substantially vertically downward to a central location adjacent to the open bottom of the conical portion are also provided.

The method of our invention may be practiced by continuously introducing a stream of finely divided phosphate rock into a mixing vessel which is open at the bottom and has the general shape of the frustum of an inverted cone, directing the stream of finely divided phosphate rock substantially vertically downward to a central location adjacent to the bottom of the mixing vessel, continuously impinging a plurality of streams of phosphoric acid upon an upper part of the mixing vessel in a direction downward at an acute angle to the axis of said frustum and substantially tangential to said inner surface, controlling the velocity and rate of flow of said streams of phosphate rock and phosphoric acid to maintain a swirling, turbulent pool of fluid acid-rock mixture in the lower part of said mixing vessel, and continuously withdrawing the resulting intimately mixed acid-rock fluid through the open bottom of the mixing vessel.

Drawings

In the attached drawings Fig. 1 and Fig. 2 show diagrammatically one particular device embodying principles of our invention and in which our novel process may be carried out. Figure 1 is a vertical section on a conical mixing vessel. Figure 2 is a plan view of the same vessel showing the line 1—1 which designates the plane of the section of Figure 1. Figure 3 shows the relationship between the mixing vessel and other cooperating apparatus used in our method for the manufacture of superphosphate. Like reference numerals designate like parts in all figures.

Figures 4, 5, 6, 7 and 8 are graphs showing correlation between which are important in the operation of our process.

Detailed description

Figure 1:
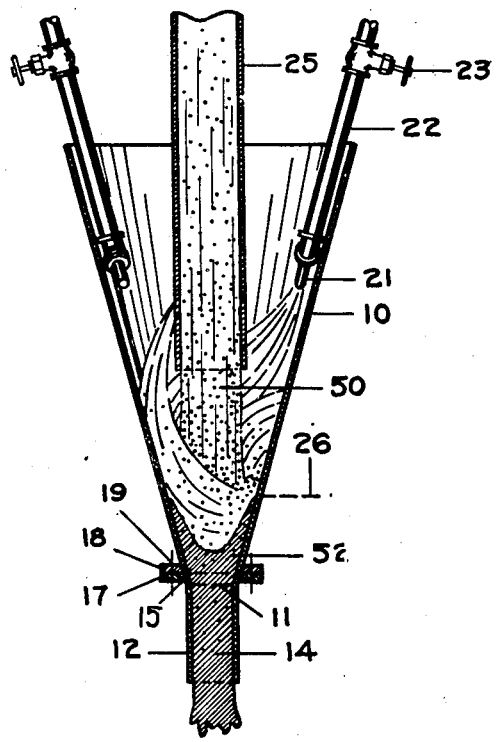

Referring to Figure 1, reference numeral 10 designates an upper portion of a mixing vessel. Portion 10 has the general shape of the frustum of an inverted cone having an open bottom 11. The walls of portion 10 preferably slope outward from the vertical axis of portion 10 at an angle of about 15°.

A cylindrical lower portion 12, having a passage 14 therethrough corresponding in size and shape to open bottom 11, is attached to portion 10 and is so disposed that passage 14 forms a continuation of open bottom 11. The lower part 15 of portion 10 is preferably made continuous with portion 12. Means for detachably connecting the same to the upper part of portion 10, such as flanges 17 and 18 and bolts 19, are provided. This detachable construction permits the interchange of a number of lower parts 15 in which the frustum of the cone is extended to different lengths and in which the open bottom 11 and passage 14 are accordingly of different diameters.

In the upper part of portion 10 a plurality of inlets 21 are disposed. These are adapted to impinge a plurality of streams of phosphoric acid upon the inner surface of portion 10 in a direction downward at an acute angle to the axis or centerline of portion 10 and substantially tangential to the inner surface. These inlets are preferably constructed of standard pipe fittings, a 45° elbow in combination with a short nipple having been found to be particularly effective. Inlets 21 are attached to and communicate with lines 22 adapted to conduct phosphoric acid under pressure to inlets 21. A means 23 for controlling the rate of flow is disposed in line 22. It is not essential that there be a means for controlling the rate of flow disposed in each line leading to an individual inlet. A single means, such as automatic valve 39 shown in Fig. 3, for controlling the rate of flow to all inlets may be used.

A means, such as pipe 25, for introducing a stream of finely divided phosphate rock at controlled rate of flow into the mixing vessel and directing the stream substantially vertically downward to a central location adjacent to the bottom of conical portion 10 is disposed within the upper part of portion 10. It is important that means 25, which may be a pipe or chute, for introducing rock, should extend far enough below the level of inlets 21 so that dust from the stream of falling rock does not strike the bare walls of portion 10.

Figure 2:
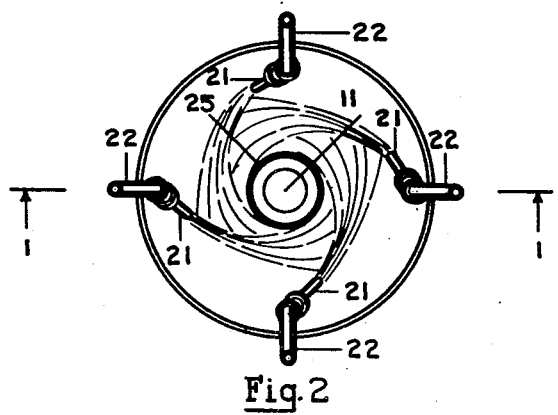
Figure 3:
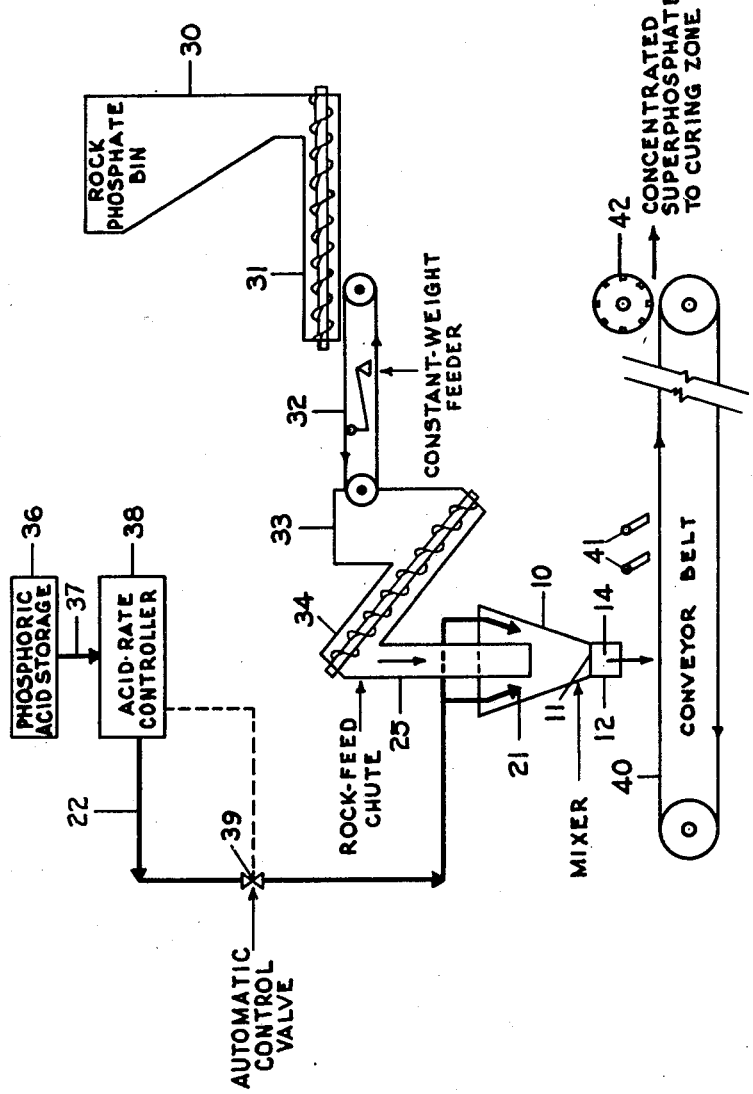

Figure 2 shows the same apparatus in plan view. Line 25 is shown as somewhat greater in diameter than open bottom 11, an arrangement which has been found to be advantageous because of the higher ratio of bulk to density in the rock stream than in acid-rock mixture. Inlets 21 are shown to be disposed counterclockwise to a circle in which they lie but the apparatus is operable with clockwise disposition of inlets. Figure 3 shows the apparatus of our invention in relationship to other elements which cooperate with it in the manufacture of superphosphate. A bin for storing finely divided phosphate rock 30 communicates with means 31 for transporting rock. Means 31 is adapted to transport rock to means 32 for controlling rate of flow of rock, illustrated as a constant weight feeder. Means 32 is adapted to introduce phosphate rock into a second bin 33 at constant rate. A means for conveying rock 34 adapted to continuously remove substantially all rock from bin 33 communicates with bin 33 and means 25 and is adapted to continuously introduce the rock removed from bin 33 into means 25 at a predetermined height above open bottom 11.

A vessel for storing phosphoric acid 36 is connected to and communicates with a means for controlling rate of acid flow 38 by line 37. Line 22 containing automatic control valve 39 is adapted to convey acid under pressure to inlets 21.

A conveyor belt 40 is preferably disposed under the mixing vessel 10, 12 and adapted to receive and remove phosphate rock-acid mixture withdrawn through open bottom 11 and passage 14. Knives 41 and disintegrator 42 are preferably disposed adjacent to belt 40 and are adapted to break up the mixture after it has ceased to be fluid.

Operation

In the operation of our invention we prefer to begin by depositing a stream of finely divided phosphate rock from bin 30 via means 31 onto means 32 for controlling the rate of flow of rock. Means 32, bin 33 and means 34 cooperate to continuously introduce a stream of rock into means 25 at a controlled rate of flow and at a predetermined height above the open bottom 11 of a mixing vessel. Control of the rate of flow is obtained by means 32 and by driving means 34 at constant speed. Constant weight feeders and other equivalent means 32 are well-known to the art and do not require full explanation here as the design of the particular means employed is not embraced in this invention. The velocity with which the stream of rock enters may be predetermined by raising or lowering the point of entry of the stream of rock into pipe 25, although this velocity may vary within wide limits without decreasing the efficiency of mixing. We prefer to allow the rock to fall from a distance of a few feet into the mixer.

Our reason for starting the rock flow first is to prevent spilling liquid phosphoric acid from passage 14 with attendant damage to equipment, danger to workmen, etc. However, if this is taken care of by providing adequate safeguard, there is no reason why the sequence of operations could not be started by introduction of acid into the mixer or by simultaneous introduction of both acid and rock.

Phosphoric acid is then fed from storage 36 via line 37 to a conventional acid rate controller 38 and line 22. The rate of flow in line 22 is controlled by automatic valve 39 regulated by acid rate controller 38. Acid is introduced from line 22 into conical portion 10 via inlets 21. Acid in line 22 is maintained under low pressure. This is most conveniently done by locating the phosphoric acid storage vessel 36 above the mixing vessel 10, 12, or by pumping acid under fairly low pressure to the mixing vessel. Automatic valve 39 controls the rate of flow of acid and the velocity of streams injected through inlets 21 of fixed diameter.

Figure 1 best shows the actual mixing operation. A stream of rock 50 is shown falling through pipe 25 to a central location adjacent to the bottom of conical portion 10. Streams of acid enter through inlets 21 and impinge upon the inner surface of portion 10 in a direction downward at an acute angle to the vertical axis of portion 10 and substantially tangential to the inner surface. This causes the streams of acid to descend the inner surface in a spiral path. Regulation of the rate of flow of acid and rock streams results in the formation of a swirling turbulent pool 52 which fills the lower part of portion 10 above open bottom 11 to a distance indicated by line 26. The stream of falling rock 50 is directed at this pool and by far the greater proportion of rock falls directly into the pool. Since the rock has a tendency to spread out in falling, not all will fall directly into the pool but some will fall upon the walls of conical portion 10 adjacent to the pool. The walls adjacent to the pool are covered with a relatively thick layer of rapidly flowing phosphoric acid which washes away the phosphate rock and carries it into the pool 52. Here the rock and acid are thoroughly mixed by the turbulence of the mixture.

Passage 14 is full of turbulent mixture at all times. Intimately mixed phosphate rock and acid falls out of the bottom of this passage at a constant velocity which is determined by the diameter of passage 14 and the depth of pool 52.

Figure 4:
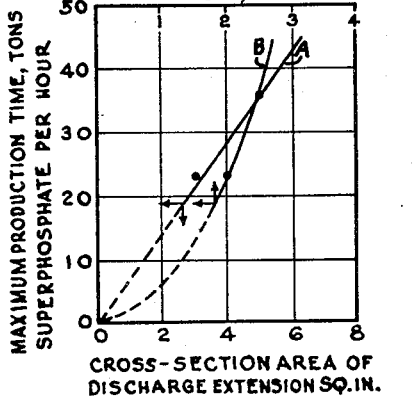

In the accompanying drawings, Fig. 4 is a graph showing correlation of the diameter and cross sectional area of passage 14 with maximum production rate. Curve A is approximately a straight line and shows correlation of maximum production rate with the cross sectional area of passage 14 in square inches. Curve B shows the correlation of maximum production rate and diameter of passage 14 in inches. We have found that best results are obtained when the mixing vessel is operated within about 15 per cent of the maximum production rate shown by Fig. 4 for a given area of passage 14.

It is essential that the stream of phosphate rock be directed substantially vertically downward into the turbulent pool of acid-rock mixture. Early attempts to feed the rock from one point at the rim of the mixer and to distribute the rock evenly around the inner surface of the conical mixing vessel resulted in failure due to penetration of the thin film of acid flowing down the inner surface. This caused solid superphosphate to quickly build up and plug the mixing vessel. We have found that it is essential that all points at which phosphate rock dust might strike the inner surface of portion 10 be covered by a fast-moving, relatively thick film of phosphoric acid. Whenever phosphate rock comes in contact with the walls of the mixing vessel, there is formed solid superphosphate which builds up and ultimately plugs the mixing vessel. For this reason it is not feasible to introduce the phosphate rock in a manner which will result in a considerable quantity of the rock falling into a thin film of acid on the inner surface of conical portion 10. It is desirable that the diameter of the pool surface be kept larger than the diameter of the rock stream to insure a sufficient depth of rapidly moving acid at points where the outer portions of the falling rock stream strike to prevent the rock from adhering to the inner surface of the conical mixing vessel.

Various factors have an effect upon the depth of the pool and upon the intensity of the swirling motion and turbulence therein. Among these are the diameter and length of passage 14, concentration and temperature of the phosphoric acid, composition, particle size, and temperature of the rock, velocity and angle of introduction of acid, and the angle of the cone.

For a given production rate a decrease in diameter or an increase in length of passage 14 will increase the resistance to flow through the mixer and will cause an increase in the depth of the pool necessary to overcome this added resistance. Changes in the concentration or temperature of the acid, or in the mineralogical and chemical, composition or particle size of the rock will change the viscosity of the fluid mixture, which in turn affects the depth of the pool. Intensity of swirling motion and turbulence may be increased by increasing the velocity of the incoming acid; and, by adjustment of the angle of introduction of the acid with respect to the vertical axis of portion 10, the maximum degree of swirling motion and turbulence within the pool may be obtained.

For a given depth of pool, decreasing the angle between the walls of conical portion 10 and the vertical axis will increase the intensity of swirling motion and turbulence within the pool. We have found that an angle of about 15° is highly efficient for this purpose, but this may be varied through fairly wide limits. It is not practical to decrease this angle very much. To do so would result in too much of the falling rock stream striking the walls of the mixing vessel and would not give sufficient space for pipe 25, which for best results, should extend to a level as near that of the surface of pool 52 as is possible without being subject to sufficient splashing of acid to cause solid superphosphate to build up on the pipe and choke the rock stream. Difficulties in maintaining pool 52 at desired level will also be encountered if the angle is made too small.

The extent to which this angle can be increased is limited by the degree of turbulence and swirling which can be obtained with the relative volumes of rock and acid which it is desired to use at the desired conditions of operation chosen from among the factors mentioned above, and by the length of time the acid-rock mixture is retained in pool 52. We prefer to limit this retention time to about two to three seconds. By properly correlating the factors mentioned, the desired depth of pool, retention time and intensity of swirling motion and turbulence may be obtained.

Factors which influence the length of time phosphate rock-phosphoric acid mixture will remain fluid are of considerable important in the operation of our method. The duration of the fluid stage must be sufficiently long to permit thorough mixing of the reactants in the mixing vessel without permitting the mixture to set up into a solid mass thereby plugging the mixing vessel. On the other hand the fluid time should not be so long as to make subsequent operations on the mixture inconvenient. A fluid time of about twenty seconds is excellent for most plant operations. This may be increased or decreased as desired, usually by changing the acid temperature or concentration. When the fluid time is about twenty seconds, the resulting superphosphate sets up to a dry, porous mass in about two to three minutes.

Figure 5:
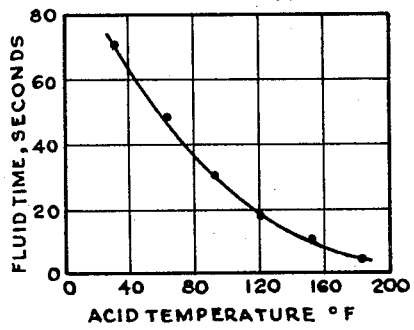
Figure 6:
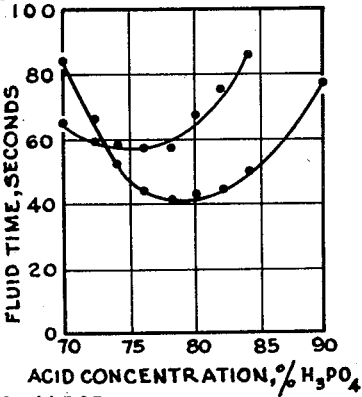

In the attached drawings, Figures 5, 6, 7, and 8 show the effect of various factors on the fluid time. The most important of these, from the standpoint of control of our process, are the temperature and concentration of the acid. Figure 5 shows the sharp decrease in fluid time which accompanies an increase in acid temperature. We have found that at any given temperature there is an acid concentration which gives a minimum fluid time. The two curves in Fig. 6 clearly show this minimum. The upper curve was obtained with a Tennessee rock containing 32.7 per cent $P_2O_5$ and the lower curve with a Tennessee rock having a $P_2O_5$ content of 33.4 per cent.

Figure 8:
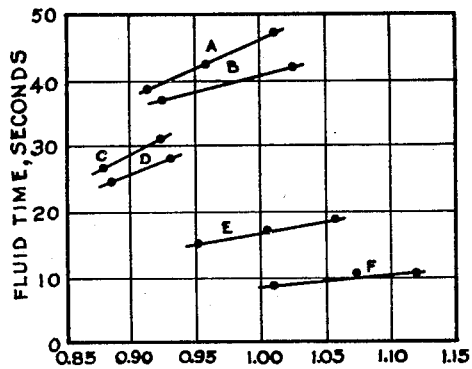
Figure 7:
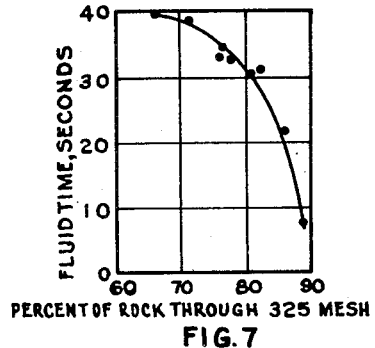

The fluid time also decreases very rapidly with increase in the proportion of rock fine enough to pass through a standard 325 mesh screen. This is shown graphically in Figure 7. The relative proportions of rock passing through coarser screens is comparatively unimportant, but the proportion of very fine material should be maintained below 80 per cent, or preferably at about 65 per cent to 70 per cent, in order to avoid difficulties in operation. The degree of acidulation of the phosphate rock is unimportant from the standpoint of control of our process and may be ignored in practice. Figure 8 shows curves A, B, C, D, E, and F correlating the degree of acidulation with the fluid time of the resulting mixtures when rocks of various composition are acidulated to various degrees shown by the points on these curves. Each curve was obtained from a rock of a particular composition.

It is quite possible to operate the apparatus of our invention without cylindrical lower portion 12 containing passage 14. When this is done the degree of mixing obtained is equivalent to that attained in the best types of mixers now in commercial use. We prefer, however, to use portion 12 as its use not only makes control of our process easier but also results in a more complete degree of mixing than is otherwise obtainable.

Example I

An apparatus was constructed as shown in Figures 1, 2, and 3 in the phosphate fertilizer plant of the Tennessee Valley Authority at Wilson Dam, Alabama. The angle between the walls of the conical portion and the vertical axis of the cone was 15°. The acid inlets were ¾ inch pipe nipples connected to acid lines by 45° elbows. These inlets slanted downward and lay flat against the walls of the conical portion. The conical portion was 18 inches in diameter and the height from flange 18 to the top of the vessel was 26 inches. The rock inlet was a vertical standard 4-inch pipe. The cross sectional area of passage 14 was 4.25 square inches.

This mixer has operated continuously for long periods of time without any necessity for shut downs. It has been operated as described above with production rates of from 18 to 50 tons per hour. After once adjusting to start operations, it is practically automatic and makes a very high quality of superphosphate. The average time the rock-acid mixture was retained in the pool at the bottom of the mixing vessel was about two seconds.

Example II

The mixer described in Example I was operated by the method of our invention in a number of runs and the costs of operation were compared with those of operating commercial sigmablade type batch mixers. The following data were obtained:

|  | Batch Type Mixer | Our Apparatus |
|---|---|---|
| Production rate, tons superphosphate/operating hr | 24 | 35 |
| Number of mixer units | 2 | 1 |
| Power required, kw.-hr.-/ton of superphosphate | 1.0 | 0.1 |
| Operating labor, man hr./ton of superphosphate | 0.16 | 0.04 |
| Maintenance labor, man hr./ton of superphosphate | 0.17 | 0.02 |
| Maintenance materials, cents/ton of superphosphate | 9.7 | 0.9 |

These data were for the mixing unit proper and do not include conveying materials to and from the unit. The power required by our apparatus was consumed principally in operation of control apparatus.

*Example III*

Superphosphate fertilizer was made from Tennessee brown phosphate rock and phosphoric acid in the batch type mixers and our apparatus described in Example II. The apparatus and process of our invention gave more complete conversion of the $P_2O_5$ contained in the rock to an available form than did the batch-type mixers. The following data were obtained:

| Mixer | Acid concn., Per cent $H_3PO_4$ | Mole ratio $P_2O_5/CaO$ in product | Total $P_2O_5$ | Available $P_2O_5$ | Free acid $P_2O_5$ | Moisture | Rock $P_2O_5$ converted to avail. form Per cent |
|---|---|---|---|---|---|---|---|
| Batch | 78 | 0.94 | 48.1 | 45.9 | 1.1 | 3.0 | 86 |
| Continuous | 78 | 0.98 | 49.1 | 47.9 | 1.5 | 3.4 | 91 |
| Do | 75 | 0.98 | 48.5 | 47.5 | 2.0 | 5.1 | 93 |

*Example IV*

Various modifications were made in the mixing apparatus of our invention. The pipe nipples forming the acid inlets were replaced by fish-tail type nozzles. No improvements in operation resulted. Use of the fish-tail nozzles was discontinued since they tended to plug more readily than pipe nipples.

The apparatus was operated with lower cylindrical portions 12 of various lengths. No improvement was obtained by making this portion longer than about six inches. Very long extensions result in some difficulties due to plugging.

The apparatus was operated without the cylindrical lower portion, and the fluid mixture was allowed to fall directly out of open bottom 11. It was found that the mixing was not quite so thorough as when the cylindrical lower portion was used, but was still comparable to that obtained in the best mixers in commercial use.

Simplicity and cheapness, both in construction and in operation, are salient characteristics of our invention. Operation may be continued for many days without the necessity for a shut down for repairs. Labor and repair costs are very low and very little floor space is required. A very high quality of superphosphate is obtained and it is possible to operate over a very wide temperature, acid concentration and acidulation range.

While our invention is described as using phosphoric acid as the acidulating agent, it is evident that other acids and mixtures of acids could also be used. A principal advantageous use of our apparatus will be found in mixing phosphate rock with acids which produce quick-setting mixtures and are difficult to mix therewith by known methods.

Having described our invention and explained its operation, we claim:

1. A process for intimately mixing finely divided phosphate rock with acid in the preparation of fertilizer which comprises continuously introducing a stream of finely divided phosphate rock at predetermined velocity into a mixing zone having the general shape of the frustum of a cone having its apex at the bottom; directing the stream of finely divided phosphate rock substantially vertically downward to a central location adjacent to the bottom of said zone; continuously introducing a plurality of streams of liquid acid into an upper part of said zone in a direction downward at an acute angle to the axis of said frustum and substantially tangential to the lateral boundaries of said zone; controlling the rate of flow and velocity of said streams of liquid acid to maintain a layer of rapidly moving liquid acid of substantial thickness upon the lateral boundaries of said zone, swirling and descending spirally along said boundaries of said zone at a controlled rate; controlling the rate of flow of said stream of phosphate rock in conjunction with the rate of descent of said liquid acid to maintain a swirling, turbulent pool of fluid acid-rock mixture in the lower part of said zone; dropping substantially all of said stream of finely divided phosphate rock directly into said swirling, turbulent pool of fluid without contact with acid higher in said mixing zone; and continuously withdrawing the resulting intimately mixed acid-rock fluid substantially vertically downward by gravity from the lower end of said zone.

2. A process for intimately mixing finely divided phosphate rock with phosphoric acid in the preparation of fertilizer which comprises continuously introducing a stream of finely divided phosphate rock, of which not more than 80 per cent is small enough to pass through a standard 325-mesh screen, at predetermined velocity into a mixing zone having the general shape of the frustum of a vertical cone having its apex at the bottom; directing the stream of finely divided phosphate rock substantially vertically downward to a central location adjacent to the bottom of said zone; continuously introducing a plurality of streams of liquid phosphoric acid into an upper part of said zone in a direction downward at an acute angle to the axis of said frustum and substantially tangential to the lateral boundaries of said zone; controlling the rate of flow and velocity of said streams of liquid acid to maintain a layer of rapidly moving liquid acid of substantial thickness upon the lateral boundaries of said zone, swirling and descending spirally along said boundaries of said zone at a controlled rate; controlling the rate of flow of said stream of phosphate rock in conjunction with the rate of descent of said liquid acid to maintain a swirling, turbulent pool of fluid acid-rock mixture in the lower part of said zone; dropping substantially all of said stream of finely divided phosphate rock directly into said swirling, turbulent pool of fluid without contact with acid higher in said mixing zone; and continuously withdrawing the resulting intimately mixed acid-rock fluid substantially vertically downward by gravity from the lower end of said zone.

3. A process for intimately mixing finely divided phosphate rock with phosphoric acid in the preparation of fertilizer which comprises continuously introducing a stream of finely divided phosphate rock, of such size that from about 65 to about 70 per cent will pass through a standard 325-mesh screen, at predetermined velocity into a mixing zone having the general shape of the frustum of a vertical cone having its apex at the bottom; directing the stream of finely divided phosphate rock substantially vertically downward to a central location adjacent to the bottom of said zone; continuously introducing a plurality of streams of liquid phosphoric acid into an upper part of said zone in a direction downward at an acute angle to the axis of said frustum and substantially tangential to the lateral boundaries of said zone; controlling the rate of flow and velocity of said streams of liquid acid to maintain a layer of rapidly moving liquid acid of substantial thickness upon the lateral boundaries of said zone, swirling and descending spirally along said boundaries of said zone at a controlled rate; controlling the rate of flow of said stream of phosphate rock in conjunction with the rate of descent of said liquid acid to maintain a swirling, turbulent pool of fluid acid-rock mixture in the lower part of said zone; dropping substantially all of said stream of finely divided phosphate rock substantially vertically downward directly into said swirling, turbulent pool of fluid without contact with acid higher in said mixing zone; and continuously withdrawing the resulting intimately mixed acid-rock fluid substantially vertically downward by gravity from the lower end of said zone.

4. A process for intimately mixing finely divided phosphate rock with phosphoric acid in the preparation of fertilizer which comprises continuously introducing a stream of finely divided phosphate rock, of which not more than 80 per cent is small enough to pass through a standard 325-mesh screen, at predetermined velocity into a mixing zone having the general shape of the frustum of a vertical cone having its apex at the bottom and having its sides inclined at an angle of about 15 degrees to its vertical axis; directing the stream of finely divided phosphate rock substantially vertically downward to a central location adjacent to the bottom of said zone; continuously introducing a plurality of streams of liquid acid containing about 75 to 78 per cent $H_3PO_4$ into an upper part of said zone in a direction downward at an acute angle to the axis of said frustum and substantially tangential to the lateral boundaries of said zone; controlling the rate of flow and velocity of said streams of liquid acid to maintain a layer of rapidly moving liquid acid of substantial thickness upon the lateral boundaries of said zone, swirling and descending spirally along said boundaries of said zone at a controlled rate; controlling the rate of flow of said stream of phosphate rock in conjunction with the rate of descent of said liquid acid to maintain a swirling, turbulent pool of fluid acid-rock mixture in the lower part of said zone; dropping substantially all of said stream of finely divided phosphate rock directly into said swirling, turbulent pool of fluid without contact with acid higher in said mixing zone; and continuously withdrawing the resulting intimately mixed acid-rock fluid substantially vertically downward by gravity from the lower end of said zone at such rate that the phosphoric acid-phosphate rock mixture is retained in said swirling turbulent pool for not more than 3 seconds.

5. A process for intimately mixing finely divided phosphate rock with phosphoric acid in the preparation of fertilizer which comprises continuously introducing a stream of finely divided phosphate rock, of which from about 65 to about 70 per cent is fine enought to pass through a standard 325-mesh screen, at predetermined velocity into a mixing zone having the general shape of the frustum of a vertical cone having its apex at the bottom and having its sides inclined at an angle of about 15 degress to its vertical axis; directing the stream of finely divided phosphate rock substantially vertically downward to a central location adjacent to the bottom of said zone; continuously introducing a plurality of streams of liquid acid containing about 75 to 78 per cent $H_3PO_4$ into an upper part of said zone in a direction downward at an acute angle to the axis of said frustum and substantially tangential to the lateral boundaries of said zone; controlling the rate of flow and velocity of said streams of liquid acid to maintain a layer of rapidly moving liquid acid of substantial thickness upon the lateral boundaries of said zone, swirling and descending spirally along said boundaries of said zone at a controlled rate; controlling the rate of flow of said stream of phosphate rock in conjunction with the rate of descent of said liquid acid to maintain a swirling, turbulent pool of fluid acid-rock mixture in the lower part of said zone; dropping substantially all of said stream of finely divided phosphate rock substantially vertically downward directly into said swirling, turbulent pool of fluid without contact with acid higher in said mixing zone; and continuously withdrawing the resulting intimately mixed acid-rock fluid substantially vertically downward by gravity from the lower end of said zone at such rate that the prosphoric acid-phosphate rock mixture is retained in said swirling, turbulent pool from 2 to 3 seconds.

STEWART A. HARVEY.
GROVER L. BRIDGER.

REFERENCES CITED

The following references are of record in the file of this patent:

UNITED STATES PATENTS

| Number | Name | Date |
| --- | --- | --- |
| 1,105,304 | Reed | July 28, 1914 |
| 1,401,527 | Doyle | Dec. 27, 1921 |
| 1,893,437 | Ober et al. | Jan. 3, 1933 |
| 1,982,479 | Ober et al. | Nov. 27, 1934 |
| 2,072,980 | Curtis | Mar. 9, 1937 |
| 2,224,355 | Moller | Dec. 10, 1940 |
| 2,306,962 | Kropp | Dec. 29, 1942 |